(12) United States Patent
Hawkins et al.

(10) Patent No.: US 8,168,344 B2
(45) Date of Patent: May 1, 2012

(54) AIR-COOLED THERMAL MANAGEMENT FOR A FUEL CELL STACK

(75) Inventors: George W. Hawkins, Portland, OR (US); Zakiul Kabir, Hillsboro, OR (US); Qimin Ming, Richland, WA (US); Yang Song, Portland, OR (US)

(73) Assignee: ClearEdge Power, Inc., Hillsboro, OR (US)

( * ) Notice: Subject to any disclaimer, the term of this patent is extended or adjusted under 35 U.S.C. 154(b) by 486 days.

(21) Appl. No.: 12/389,966

(22) Filed: Feb. 20, 2009

(65) Prior Publication Data

US 2010/0216044 A1 Aug. 26, 2010

(51) Int. Cl.
*H01M 8/04* (2006.01)
(52) U.S. Cl. .................................................. 429/439
(58) Field of Classification Search .................. 429/439
See application file for complete search history.

(56) References Cited

U.S. PATENT DOCUMENTS

| | | | |
|---|---|---|---|
| 4,324,844 A | * | 4/1982 | Kothmann ............... 429/434 |
| 4,548,196 A | * | 10/1985 | Torobin ................... 126/654 |
| 6,773,841 B2 | | 8/2004 | Rapaport et al. |
| 7,125,624 B2 | | 10/2006 | Tanno |
| 2003/0096147 A1 | | 5/2003 | Badding et al. |
| 2005/0136317 A1 | | 6/2005 | Ferguson |
| 2006/0127729 A1 | | 6/2006 | Roscoe et al. |
| 2006/0204796 A1 | | 9/2006 | Potnis |
| 2007/0003814 A1 | | 1/2007 | Fisher et al. |
| 2008/0053592 A1 | * | 3/2008 | Khadilkar et al. ....... 156/89.11 |

\* cited by examiner

*Primary Examiner* — Robert Hodge
*Assistant Examiner* — Daniel Gatewood
(74) *Attorney, Agent, or Firm* — Alleman Hall McCoy Russell & Tuttle LLP

(57) ABSTRACT

The air-cooled thermal management of a fuel cell stack is disclosed. One disclosed embodiment comprises a cooling plate apparatus for an air-cooled fuel cell stack, where the cooling plate comprises a body configured to receive heat from one or more fuel cells in thermal communication with the body, and airflow channels formed in the body and configured to allow a flow of a cooling air to pass across the body. An insulating structure is disposed in the airflow channels, wherein the insulating structure has decreasing thickness from a cooling air inlet toward a cooling air outlet.

14 Claims, 3 Drawing Sheets

AIR-COOLED THERMAL MANAGEMENT FOR A FUEL CELL STACK

BACKGROUND

A high-temperature proton exchange membrane (PEM) fuel cell system may be air-cooled. Such a fuel cell system may comprise a stack of fuel cells with cooling plates interspersed within the stack. The cooling plates each may comprise airflow channels through which a cooling air passes to cool the fuel cells. Heat from the fuel cell stack is conducted to cooling plates, and removed from the plates by air flowing through the airflow channels.

One type of high-temperature PEM fuel cell utilizes an electrolyte membrane formed from polybenzimidazole (PBI) and phosphoric acid. Such fuel cells are often operated at temperatures within a range of 120° C. to 180° C., depending upon a specific fuel cell system design. In such a fuel cell, operating the fuel cell at too high of temperatures may damage the fuel cell system, while operating the fuel cell at too low of temperatures may limit cell performance and cause irrecoverable damage.

SUMMARY

Various embodiments related to the air-cooled thermal management of a fuel cell stack are disclosed herein. For example, one disclosed embodiment comprises a cooling plate apparatus for an air-cooled fuel cell stack. The cooling plate comprises a body configured to receive heat from one or more fuel cells in thermal communication with the body. The cooling plate further comprises one or more airflow channels formed in the body and configured to allow a flow of a cooling air to pass across the body. Further, an insulating structure is disposed in the airflow channels, wherein the insulating structure has decreasing thickness from a cooling air inlet toward a cooling air outlet.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
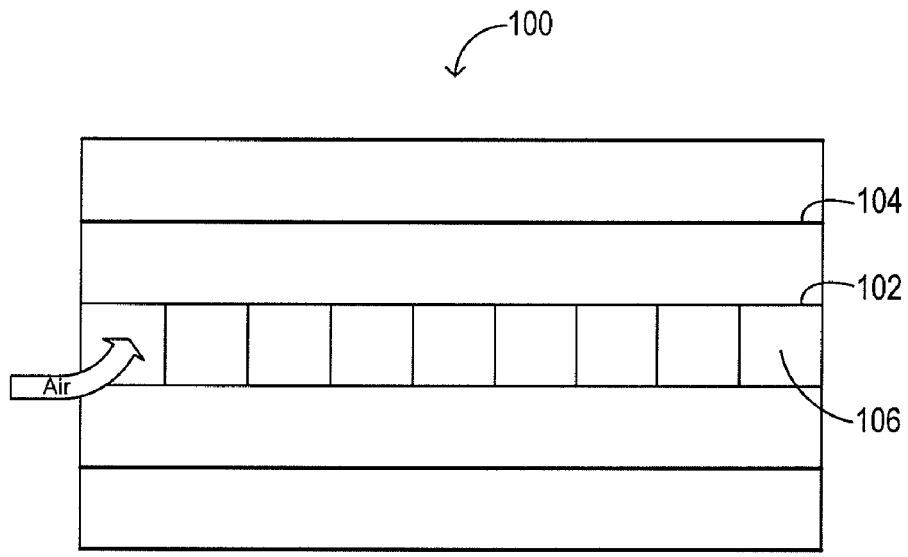
FIG. 1 shows a schematic depiction of an embodiment of a fuel cell stack comprising a cooling plate with airflow channels.

FIG. 1 shows a schematic depiction of an embodiment of a fuel cell system 100. Fuel cell system 100 comprises a cooling plate 102 positioned between a plurality of fuel cells 104 such that cooling plate 102 conducts heat away from the fuel cells 104. In one embodiment, fuel cells 104 are high-temperature PEM fuel cells. Details of fuel cell system 100, such as electrodes, electrolytes, and electrical components are not shown for the purpose of clarity.

Continuing with FIG. 1, cooling plate 102 comprises a plurality of airflow channels 106 configured to allow a flow of a cooling air across cooling plate 102 to thereby remove heat from the cooling plate. In this manner, cooling plate 102 may help to maintain the fuel cell system 100 within a desired temperature range, and therefore facilitate longevity and proper operation of the fuel cell.

Due to the nature of heat transfer between air and metal, the cooling air may initially increase in temperature relatively rapidly as it flows through airflow channels 106. Because a rate of heat transfer between cooling plate 102 and the air is a function of a temperature difference between cooling plate 102 and the air, as the temperature of the cooling air rises, the rate of heat transfer slows. Due to the rapid initial heating of the cooling air, fuel cells 104 may have lower temperatures in the regions adjacent to a cooling air inlet of cooling plate 102 than in the regions adjacent to a cooling air outlet of cooling plate 102. Under some operating conditions, this non-uniform temperature profile, which may be referred to as an in-plane temperature difference across the fuel cell, may be sufficiently high such that portions of the fuel cell may be outside of the operating temperature range. As a result, performance of the fuel cell may be impaired or rapid degradation may take place.

Figure 2:
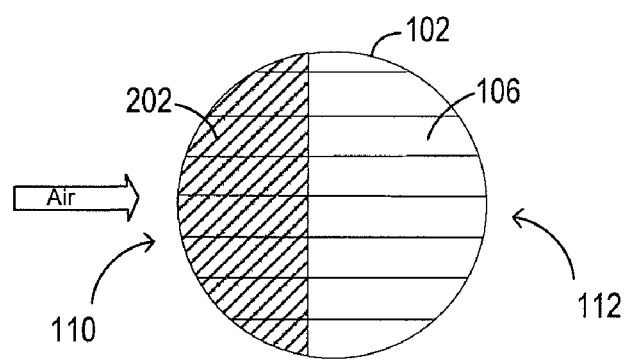
FIG. 2 shows an embodiment of a cooling plate comprising an insulating structure disposed over a portion of the cooling plate.

Therefore, to help reduce the non-uniformity of the temperature across cooling plate 102, an insulating structure may be applied to cooling plate 102 in such a manner that heat is transferred to the cooling air more slowly toward the cooling air inlet of cooling plate 102, and then transferred more rapidly at a location toward the cooling air outlet of the cooling plate 102. For example, FIG. 2 shows that cooling plate 102 comprises an insulating structure 202 disposed in airflow channels 106 across only a portion of cooling plate 102. Although cooling plate 102 is depicted in FIG. 2 as being round, cooling plate 102 and/or corresponding fuel cells may be of any other suitable shape such as square, rectangular, etc.

In this manner, insulating structure 202 has a decreasing thickness from the cooling air inlet 110 toward a cooling air outlet 112 of cooling plate 102. The term "decreasing thickness" signifies any configuration in which the insulating structure has a greater thickness toward the inlet than toward the outlet, including but not limited to a zero thickness (i.e. no insulating structure) toward the outlet, as shown in FIG. 2. Insulating structure 202 may have any suitable configuration that achieves a decreasing thickness from the cooling air inlet 110 toward the cooling air outlet 112. For example, the thickness of the layer of insulating structure 202 toward the cooling air outlet 112 may decrease in one or more sharp steps, or may decrease gradually. Some embodiments therefore may comprise an insulating structure that covers the entire length of airflow channels 106 in a decreasing thickness from cooling air inlet 110 to cooling air outlet 112, while other embodiments comprise only a partial covering. Further, yet other embodiments may comprise a first insulating structure with a lower thermal conductivity disposed toward the cooling air inlet, and a second insulating structure with a higher thermal conductivity disposed toward the cooling air outlet. Even if the second material has a greater thickness than the first material, the thickness of the first material decreases toward the outlet, and therefore falls within this description.

In embodiments in which the insulating structure covers only a portion of a cooling channel, insulating structure 202 may extend any suitable distance from the cooling air inlet toward the cooling air outlet. Suitable distances may depend upon the thermal characteristics of a specific fuel cell system. For example, the insulating structure may be located wholly within a front half of the cooling plate relative to a distance between the cooling air inlet and the cooling air outlet. In the specific embodiment of FIG. 2, insulating structure 202 extends approximately ⅓ the diameter of cooling plate 102. However, in other embodiments, the insulating structure may extend either a greater or lesser distance along the diameter of a cooling plate.

Insulating structure 202 may restrict heat flow into the cooling air where it is present, such that heat is transferred between fuel cells 104 and the cooling air more slowly. Therefore, in the configuration described above, heat may be transferred more slowly to the cooling air as it first enters cooling plate 102, which may prevent over-cooling the portions of fuel cells 104 adjacent to cooling air inlet 110. Likewise, this also may help to prevent under-cooling of the portions of fuel cells 104 adjacent to cooling air outlet 112. Thus, cooling plate 102 depicted in FIG. 2 may reduce the in-plane temperature difference across the fuel cell. This may help to keep the fuel cells 104 entirely within a desired operating range, and therefore may allow the cell to be tuned for higher performance. Furthermore, this also may help to avoid overheating damage of the cell.

Figure 3:
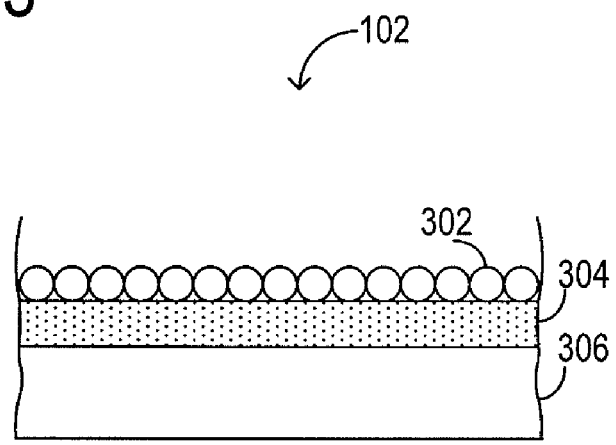
FIG. 3 shows a schematic sectional view of an embodiment of a cooling plate illustrating layers of adhesive and insulating material.

Any suitable material or materials may be used as insulating structure 202. FIG. 3 shows a schematic sectional view illustrating one suitable embodiment of insulating structure 202, in which insulating structure 202 comprises a granular insulating material 302 adhered to cooling plate 102 via a layer of an adhesive 304. Such an insulating structure 202 may be relatively simple to manufacture within a desired tolerance, as insulating material 302 may be deposited in a layer-by-layer manner via the alternating deposition of adhesive and insulating material. While only a single layer of insulating material 302 and a single layer of adhesive 304 are shown in FIG. 3, it will be understood that an insulating structure may comprise a plurality of adhesive and/or insulating material layers. It will further be understood that any other suitable insulating structure than a granular structure also may be used, including continuous amorphous, polycrystalline or crystalline coatings.

Continuing with FIG. 3, any suitable granular material may be used as insulating material 302. Examples include, but are not limited to, glass microballoons or microspheres. In other embodiments, the granular insulating material may comprise ceramic insulation paint. Likewise, any suitable adhesive may be used to bind insulating material 302 to cooling plate 202. In one embodiment, the adhesive comprises rosin. Rosin may be dissolved in alcohol for application, and therefore may be controllably applied to the cooling plate in a thin layer in the cooling channels. Further, rosin may be cured by heating to bind the granular insulating material to cooling plate 202.

Figure 4:
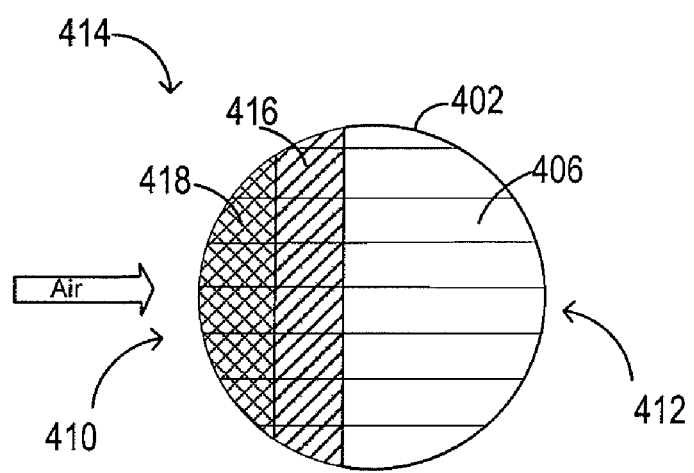
FIG. 4 shows another embodiment of a cooling plate comprising an insulating structure disposed over a portion of the cooling plate.

As mentioned above, an insulating structure may comprise more than one layer of insulating material. FIG. 4 shows another embodiment of cooling plate 402 comprising an insulating structure 414 disposed over a portion of a cooling plate 402. In this embodiment, insulating structure 414 comprises two layers of insulating material. An upper layer 418 may extend a same distance along the cooling plate, or the upper layer may extend a lesser distance than a lower layer 416 such that the overall thickness of the insulating structure decreases in a direction toward a trailing edge (i.e. airflow outlet) of cooling plate 402. It will be understood that other embodiments may comprise three or more layers of insulating material.

An insulating structure comprising two layers or more layers of insulating material, such as insulating structure 414, may allow for flexibility in constructing a desired insulating profile. For example, layers 414 create a stair-step profile of decreasing thickness. In a similar matter, further layers may be added to create additional steps for further thickness adjacent to the cooling air inlet.

Any suitable method may be used to form an insulating structure as disclosed herein. Suitable methods include, but are not limited to, those that allow a layer of an insulating material of a desired thickness to be controllably deposited. Examples of such suitable methods may include, but are not limited to, dip coating, sputtering, chemical vapor deposition, evaporation, painting, and other such deposition methods.

Figure 5:
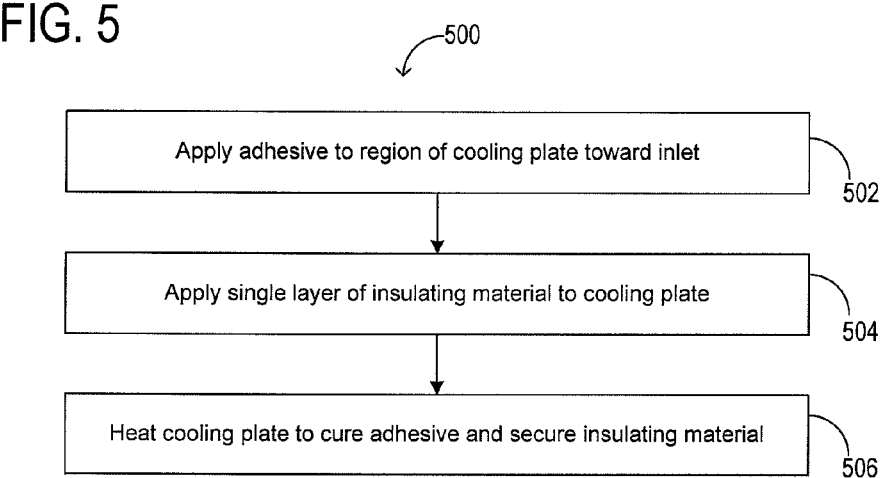
FIG. 5 shows a process flow depicting an embodiment of a method of applying an insulating material to a cooling plate.

One such method utilizing the above-described adhesive and microballons is depicted as method 500 in FIG. 5. Method 500 first comprises, at 502, applying adhesive to the cooling plate (for example, a region within a front half of an inner surface of airflow channels of the cooling plate in one specific embodiment, wherein the term "front half" refers to a portion from a cooling air inlet to a point halfway to a cooling air outlet). In one specific embodiment, the adhesive comprises rosin. Likewise, in one specific embodiment, the adhesive is applied to a front third of the airflow channels of cooling plate.

Method 500 at 504 next comprises applying a single layer of insulating material to the cooling plate. In one embodiment, spherical glass microballoons may be used as the insulating material. The insulating material may be applied by dip coating, or in any other suitable manner. Method 500 next comprises, at 506, heating the cooling plate to cure the adhesive and secure the insulating material. In embodiments where rosin is used as the adhesive and spherical glass microballoons are used as the insulating material, heating the cooling plate may cause the rosin to convert to a rigid varnish-like coating that maintains good adhesion to the glass microballoons at high temperature and cooling air flow rates.

Figure 6:
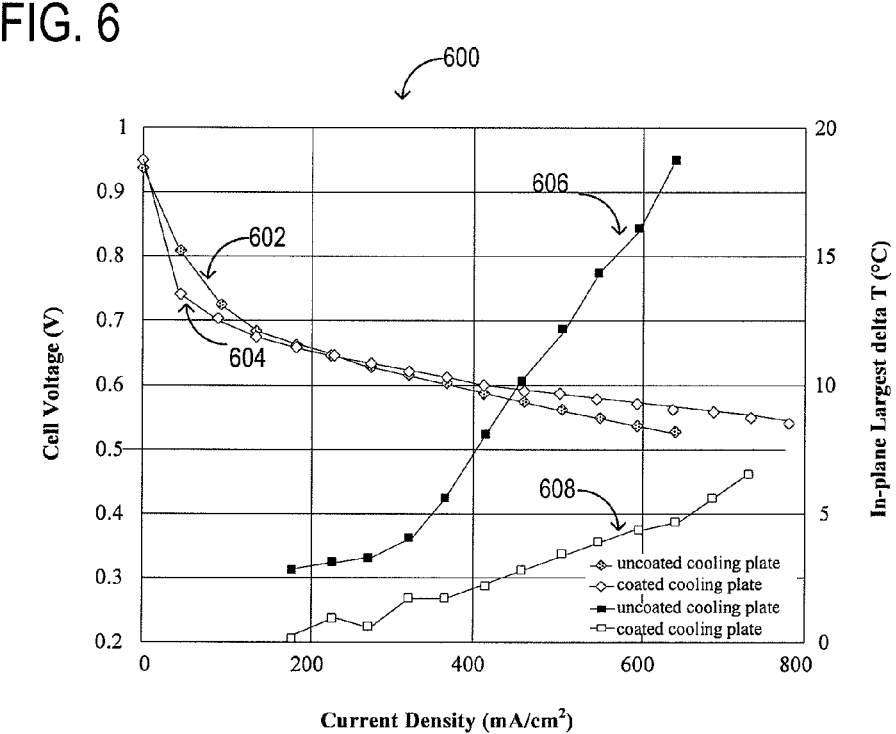
FIG. 6 shows a graph comparing a cell voltage and an in-plane temperature difference against current density for an embodiment of a coated cooling plate compared to an uncoated cooling plate.

FIG. 6 shows a graph 600 comparing a cell voltage and an in-plane largest temperature difference against current density for an embodiment of a coated cooling plate compared to an uncoated cooling plate. Lines 602 and 604 depict power density for a stack comprising uninsulated cooling plates and a similar stack comprising insulated cooling plates, respectively, by comparing cell voltage as a function of current density. Lines 606 and 608 depict a largest in-plane temperature difference across a fuel cell in a stack comprising uninsulated cooling plates and a similar stack comprising insulated cooling plates, respectively. The fuel cell stack used for data collection comprises a high-temperature PEM fuel cell system comprising six fuel cells with three aluminum cooling plates.

First referring to the uninsulated ("uncoated" in FIG. 6) cooling plates, it can be seen that, if an inlet-to-outlet temperature difference of 10° C. is desired, a current density from the fuel cell may be limited to approximately 411 $mA/cm^2$. In contrast, with the insulated cooling plates, a much higher current density may be achieved without reaching the 10° C. in-plane temperature difference. This may allow a larger power density to be achieved than with the use of uncoated cooling plates. This may allow the use of fewer fuel cells in a stack, thereby decreasing system size and manufacturing costs. For example, this may allow a number of cells in a 2 kW stack that utilizes 32 cells with uninsulated cooling plates to be reduced by 8 cells.

It will be understood that the embodiments described herein are exemplary in nature, and that these specific embodiments or examples are not to be considered in a limiting sense, because numerous variations are contemplated. Accordingly, the present disclosure includes all novel and non-obvious combinations and sub-combinations of the various embodiments disclosed herein, as well as any and all equivalents thereof.

The invention claimed is:

1. A cooling plate apparatus for an air-cooled fuel cell stack, the apparatus comprising:
    a body configured to receive heat from one or more fuel cells in thermal communication with the body;
    one or more airflow channels formed in the body and configured to allow a flow of a cooling air to pass across the body; and
    an insulating structure disposed in the airflow channels and having a decreasing thickness from a cooling air inlet toward a cooling air outlet.

2. The apparatus of claim 1, wherein the air-cooled fuel cell stack comprises a plurality of high-temperature proton exchange membrane (PEM) fuel cells.

3. The apparatus of claim 1, wherein the cooling plate is located adjacent to a plurality of fuel cells.

4. The apparatus of claim 1, wherein the insulating structure comprises an adhesive and a layer of an insulating material.

5. The apparatus of claim 4, wherein the adhesive comprises rosin.

6. The apparatus of claim 4, wherein the insulating material comprises a plurality of spherical glass microballoons.

7. The apparatus of claim 6, wherein the insulating material comprises a single layer of the spherical glass microballoons that extends only partway from the cooling air inlet to the cooling air outlet.

8. The apparatus of claim 1, wherein the insulating structure lies within only a front half of an inner surface of the cooling plate.

9. A fuel cell system, the system comprising:
    a high-temperature PEM fuel cell;
    a cooling plate apparatus located adjacent to the high-temperature PEM fuel cell;
    wherein the cooling plate comprises:
    a body configured to receive heat from one or more fuel cells in thermal communication with the body;
    one or more airflow channels formed in the body and configured to allow a flow of a cooling air to pass across the body;
    and an insulating structure disposed in one or more airflow channels and having a decreasing thickness from a cooling air inlet toward a cooling air outlet.

10. The system of claim 9, wherein the cooling plate apparatus comprises one or more airflow channels formed in a body and configured to allow a flow of a cooling air to pass across the body.

11. The system of claim 9, wherein the insulating structure lies within only a front half of an inner surface of the cooling plate.

12. The system of claim 9, wherein the insulating structure comprises an adhesive and a layer of an insulating material.

13. The apparatus of claim 1 wherein the insulating structure is positioned only in a front half of the cooling plate, and wherein the plate is rounded with a variable width, and the one or more airflow channels having a constant width, from the cooling air inlet to the cooling air outlet.

14. The apparatus of claim 1 wherein the insulating structure includes a first and second layer positioned on an interior surface of the airflow channels, the first and second layers only part way along the channels from the cooling air inlet to the cooling air outlet, the first and second layer having a stair step profile of decreasing thickness, wherein the plates are aluminum.

* * * * *